(12) United States Patent
Houser et al.

(10) Patent No.: US 11,018,483 B2
(45) Date of Patent: May 25, 2021

(54) CABLE PREPARATION MACHINE

(71) Applicants:TE CONNECTIVITY CORPORATION, Berwyn, PA (US); Tyco Electronics Mexico, S. de R.L. de C.V., Tlalnepantla (MX)

(72) Inventors: Matthew Steven Houser, Hummelstown, PA (US); Gary Lee Deck, Bethel, PA (US); Christopher John Gavlak, Mechanicsburg, PA (US); Michael Morris, Harrisburg, PA (US); Natalie C. Wheeler, Etters, PA (US); Scott M. Wright, Camp Hill, PA (US); Daniel Enrique Juarez Gerardo, Guaymas (MX)

(73) Assignees: TE Connectivity Corporation, Berwyn, PA (US); Tyco Electronics Mexico, S. de R.L. de C.V.

( * ) Notice: Subject to any disclaimer, the term of this patent is extended or adjusted under 35 U.S.C. 154(b) by 346 days.

(21) Appl. No.: 16/120,717

(22) Filed: Sep. 4, 2018

(65) Prior Publication Data
US 2020/0076173 A1    Mar. 5, 2020

(51) Int. Cl.
*H02G 1/12* (2006.01)
(52) U.S. Cl.
CPC .................................. *H02G 1/1265* (2013.01)

(58) Field of Classification Search
CPC ...... H02G 1/1297; H02G 1/12; H02G 1/1212; H02G 1/1265
See application file for complete search history.

(56) References Cited

U.S. PATENT DOCUMENTS

| | | | |
|---|---|---|---|
| 3,965,570 A * | 6/1976 | Kozulla | B26B 25/00 30/90.1 |
| 5,072,632 A | 12/1991 | Sayyadi | |
| 9,906,005 B2 * | 2/2018 | Baldauf | H02G 1/1256 |
| 2005/0170696 A1 | 8/2005 | Matsuoka | |
| 2016/0105006 A1 | 4/2016 | Landes | |
| 2018/0090918 A1 | 3/2018 | Houser et al. | |

OTHER PUBLICATIONS

International Search Report, International Application No. PCTIB2019/057205, International Filing Date, Aug. 27, 2019.

* cited by examiner

*Primary Examiner* — David B. Thomas

(57) ABSTRACT

A cable preparation machine includes a blade assembly having arms and braid blades mounted thereto and disposed about a cable opening receiving a cable end along a cable axis. The arms are movable between retracted positions and advanced positions to move the braid blades. The braid blades have edges configured to engage a cable braid of the cable to cut the cable braid. The cable preparation machine includes a mandrel coupled to the end of the cable between the cable braid and an inner insulator of the cable. The braid blades are rotated around the cable axis pressing the cable braid between the edges of the braid blades and the mandrel to cut the braid blade.

20 Claims, 9 Drawing Sheets

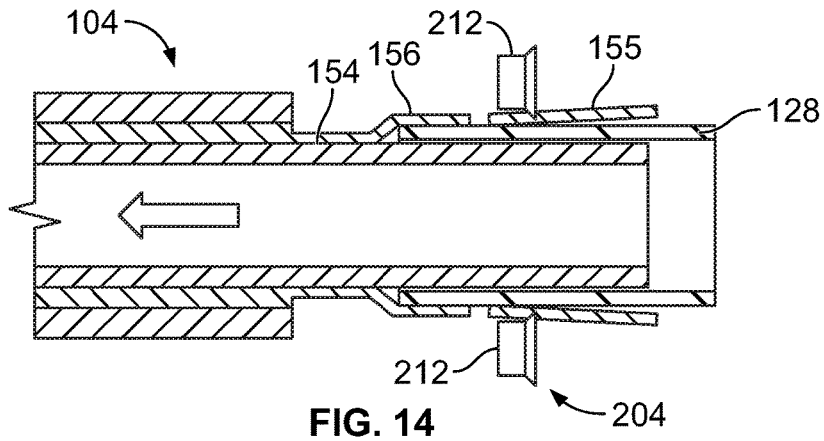
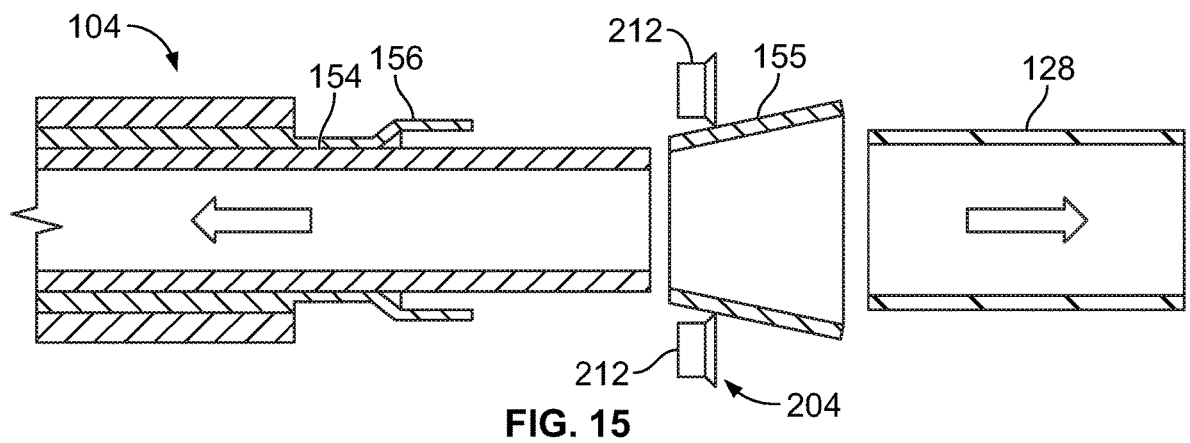
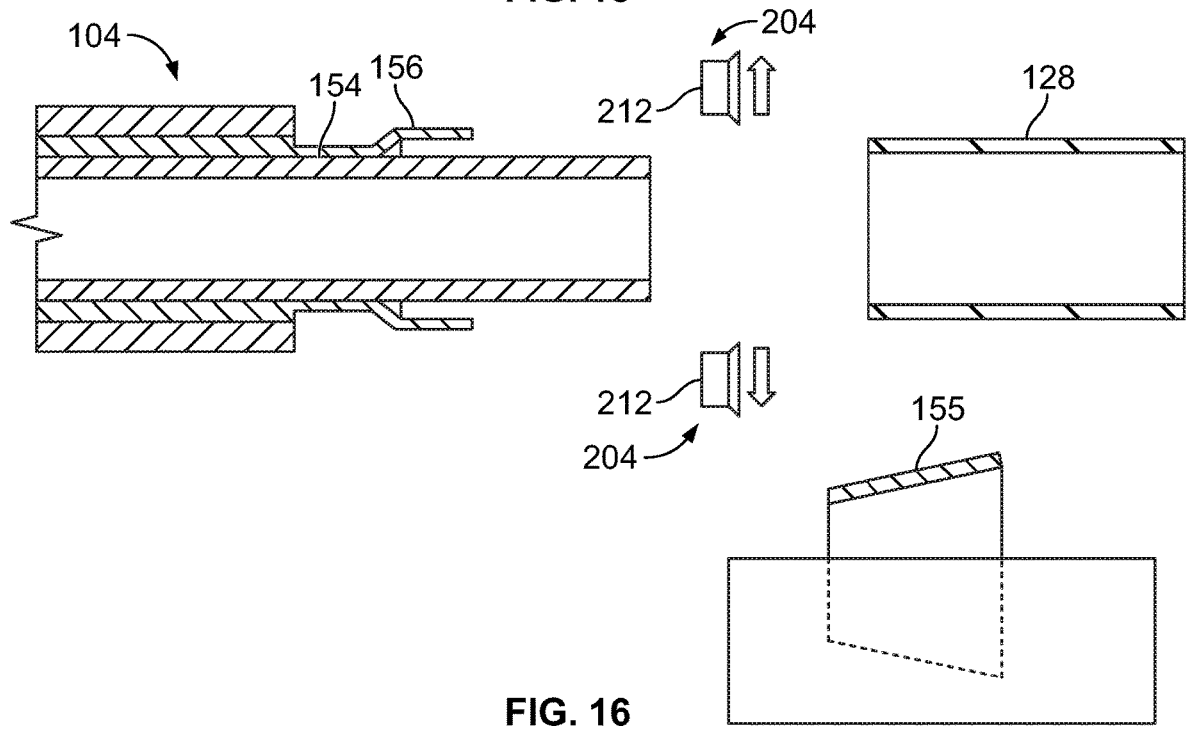

CABLE PREPARATION MACHINE

BACKGROUND OF THE INVENTION

The subject matter herein relates generally to a cable preparation machine.

Cables are used in many applications. Typically, an end of the cable is prepared for termination to a terminal, contact, connector, circuit board or other component by exposing the conductor(s) of the cable. For example, with a coaxial or shielded cable, the cable typically includes a center conductor, an inner insulator, an outer conductor, such as in the form of a cable braid, and an outer insulator, such as a cable jacket. Cable preparation processes typically involve removal of the various layers of the cable for termination of the conductive layers to the component. For example, the outer insulator is stripped to expose the cable braid, the cable braid is stripped to expose the inner insulator and the inner insulator is stripped to expose the inner conductor.

Conventional cable preparation processes require several different process steps and several different preparation machines to perform all of the preparation steps. For example, the cable is typically inserted into a first machine to remove the outer insulator. The cable is then removed from the first machine and inserted into a second machine to remove the cable braid. The cable is removed from the second machine and then inserted into a third machine, or back into the first machine, to remove the inner insulator. Different steps and different machines are used because different preparation operations on the same cable need different cutting blades and other considerations performed in independent machines. Conventional cable preparation processes are time-consuming and expensive.

Additionally, cutting of the cable braid is difficult because the cable braid is manufactured from a metal, braided material. Typically, a punch and die machine is used for cutting the cable braid where a die is inserted under the cable braid and a punch is closed around the cable braid and the die to cut the cable braid. Such machines are complex and expensive. Additionally, loading of the die between the cable braid and the inner insulator is difficult. The cable braid is typically flared outward, such as by hand, to create a space for the die, which is time consuming and may injure the operator.

A need remains for a cable preparation machine capable of preparing and cutting braid shields in a cost effective and reliable manner.

BRIEF DESCRIPTION OF THE INVENTION

In one embodiment, a cable preparation machine is provided including a blade assembly having a plurality of arms and braid blades mounted to the corresponding arms. The arms and the braid blades are disposed about a cable opening configured to receive an end of a cable therein along a cable axis. The arms are movable relative to each other between retracted positions and advanced positions. The arms move the braid blades closer to each other within the cable opening as the arms are moved from the retracted positions to the advanced positions. The braid blades have edges configured to engage a cable braid of the cable to cut the cable braid. The cable preparation machine includes a mandrel configured to be coupled to the end of the cable between the cable braid and an inner insulator of the cable. The braid blades are rotated around the cable axis pressing the cable braid between the edges of the braid blades and the mandrel to cut the braid blade.

In another embodiment, a cable preparation machine includes a blade assembly having a plurality of arms and braid blades mounted to the corresponding arms. The arms and the braid blades are disposed about a cable opening configured to receive an end of a cable therein along a cable axis. The arms are movable relative to each other between retracted positions and advanced positions. The arms move the braid blades closer to each other within the cable opening as the arms are moved from the retracted positions to the advanced positions. The braid blades have edges configured to engage a cable braid of the cable. The braid blades are advanced in a first advancing configuration by the arms to pinch the cable braid inward against an inner insulator of the cable and flare outward an end of the cable braid forward of the braid blades. The braid blades are advanced in a second advancing configuration by the arms at a different location relative to the cable to cut the cable braid. The cable preparation machine includes a mandrel coupled to the end of the cable after the cable braid has been flared and before the cable braid has been cut. The mandrel is positioned between the cable braid and the inner insulator of the cable. The braid blades are rotated around the cable axis pressing the cable braid between the edges of the braid blades and the mandrel to cut the braid blade.

In a further embodiment, a cable preparation machine is provided including a frame forming a cable cutting zone having a cable opening along a cable axis at the cable cutting zone receiving an end of a cable. The cable preparation machine includes a pulley assembly rotatably coupled to the frame about the cable axis, a drive assembly operably coupled to the pulley assembly to rotate the pulley assembly about the cable axis and a blade assembly operably coupled to the pulley assembly and rotated with the pulley assembly about the cable axis. The blade assembly includes a plurality of arms and braid blades mounted to the corresponding arms. The arms and the braid blades are disposed about the cable opening along the cable axis. The arms are movable relative to the pulley assembly between retracted positions and advanced positions. The arms move the braid blades closer to each other within the cable opening as the arms are moved from the retracted positions to the advanced positions. The braid blades have edges configured to engage a cable braid of the cable to cut the cable braid. The cable preparation machine includes a mandrel coupled to the end of the cable between the cable braid and an inner insulator of the cable. The braid blades are rotated around the cable axis pressing the cable braid between the edges of the braid blades and the mandrel to cut the braid blade.

BRIEF DESCRIPTION OF THE DRAWINGS

FIG. 14 illustrates the cut slug of the cable braid 156 partially removed from the end of the cable 104.

FIG. 15 illustrates the cut slug of the cable braid 156 removed from the end of the cable 104.

FIG. 16 illustrates the cut slug of the cable braid 156 discarded from the end of the cable 104.

DETAILED DESCRIPTION OF THE INVENTION

Figure 1:
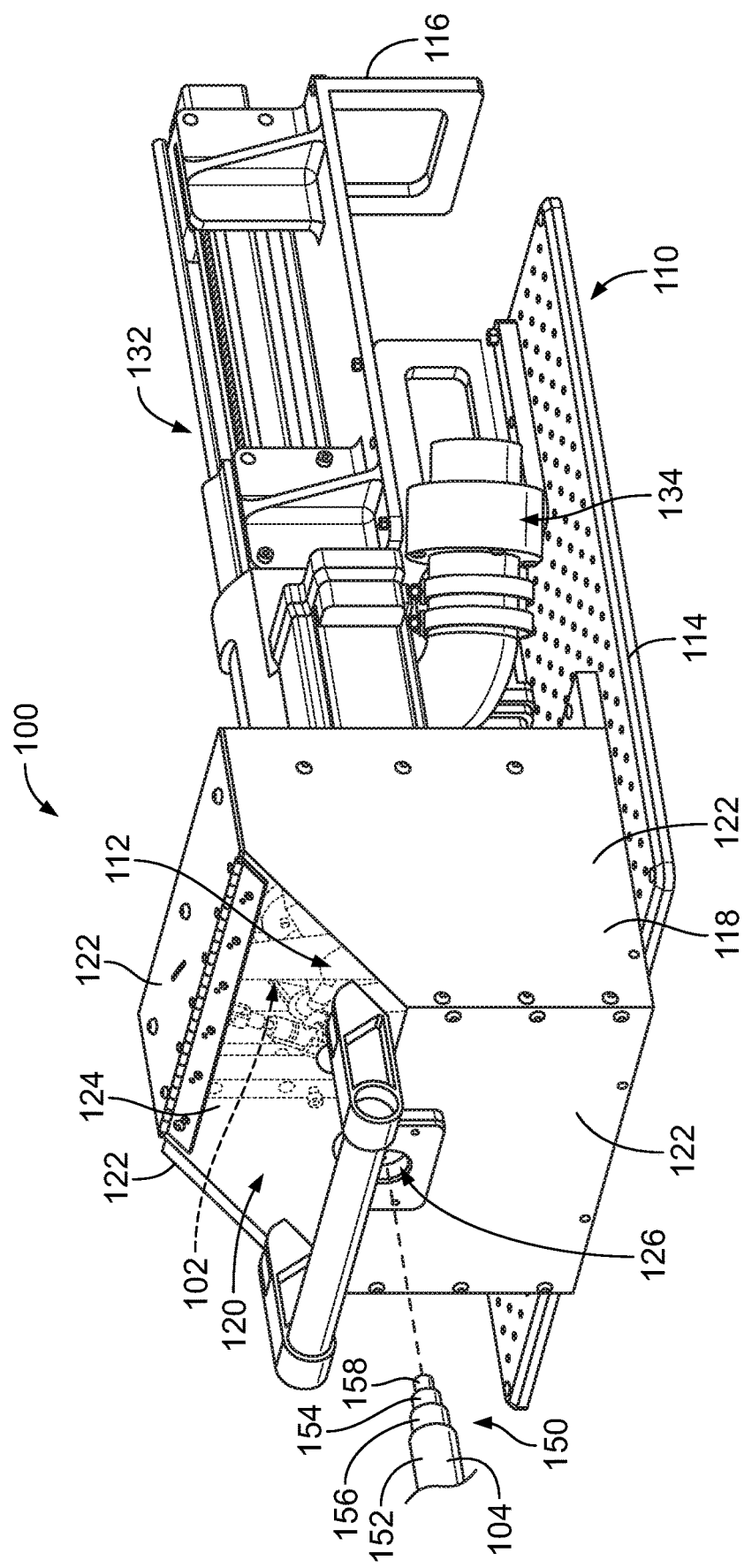
FIG. 1 illustrates a cable preparation machine 100 in accordance with an exemplary embodiment.

FIG. 1 illustrates a cable preparation machine 100 in accordance with an exemplary embodiment. The cable preparation machine 100 includes a cable cutting device 102 configured to cut and remove one or more insulators from an end 150 of a cable 104, such as an outer insulator 152 (for example, a cable jacket) and/or an inner insulator 154, and configured to cut and remove a cable braid 156 from the end 150 of the cable 104. The inner insulator 154 separates the cable braid 156 from an inner conductor 158 of the cable 104. The cable braid 156 provides electrical shielding for the inner conductor 158. The inner conductor 158 may be a solid core wire or a stranded wire. In an exemplary embodiment, the cable preparation machine 100 is configured to flare the cable braid 156. Optionally, the cable preparation machine 100 may be configured to fold the cable braid 156 at the end of the cable 104. The cable preparation machine 100 is able to prepare the end of the cable 104 without moving the cable 104 between different machines. For example, the cable cutting device 102 includes different blades for cutting the insulator(s) 152, 154 and the cable braid 156 during different cable cutting steps within the cable preparation machine 100 without removing the cable 104 from the cable cutting zone of the cable cutting device 102. The blades used for cutting the cable braid 156 may be used for flaring the end of the cable braid 156 prior to cutting. For example, the cable braid 156 is flared to insert a mandrel 128 between the cable braid 156 and the inner insulator 154 that is used for cutting the cable braid 156. The end of the cable 104 may be processed and prepared quickly and efficiently using a single machine.

The cable preparation machine 100 includes a frame 110 supporting the various components of the cable preparation machine 100. The frame 110 forms a cable preparation zone 112 where the end of the cable 104 is processed and prepared. For example, the cable cutting device 102 is located at the cable preparation zone 112. The frame 110 includes a base 114 and support members 116 mounted to the base 114. The support members 116 support various components of the cable preparation machine 100, such as the cable cutting device 102 and the mandrel 128 used for cutting the cable braid 156. In an exemplary embodiment, the frame 110 includes a cabinet 118 housing the cable cutting device 102 in a chamber 120 of the cabinet 118. The cabinet 118 surrounds the cable cutting device 102 to prevent injury to the operator of the cable preparation machine 100. The cabinet 118 includes one or more walls 122 surrounding the chamber 120. Optionally, the cabinet 118 includes a door 124 for accessing the chamber 120. In an exemplary embodiment, the cabinet 118 includes a cable opening 126 through one or more of the walls 122 to allow the cable 104 to be loaded into the chamber 120 to the cable preparation zone 112. The mandrel 128 is rearward of the cabinet 118 and may extend into the cabinet 118. In an exemplary embodiment, the mandrel 128 is axially aligned with the cable opening 126 and the cable preparation zone 112; however, the mandrel 128 may be at other locations in alternative embodiments.

In an exemplary embodiment, the cable preparation machine 100 includes a cable holder 130 (shown in FIG. 5) in the cabinet 118 that holds the cable 104 during the cable preparation process. For example, the cable holder 130 holds the cable 104 in the cable preparation zone 112 for removal of the insulator(s) 152, 154 and the cable braid 156. Optionally, the cable holder 130 is movable relative to the frame 110 to position the cable 104 in the cable preparation zone 112. The cable 104 may be moved by the cable holder 130 axially forward or rearward within the cable preparation zone 112, such as relative to the cable cutting device 102, during the various cable preparation processes.

In an exemplary embodiment, the cable preparation machine 100 includes a braid manipulation device 132 configured to flare the cable braid 156 during processing of the end of the cable 104 and/or configured to fold the cable braid 156 backwards during processing of the end of the cable 104. The cable cutting device 102 may form part of the braid manipulation device 132. The mandrel 128 may form part of the braid manipulation device 132. The cable holder 130 may form part of the braid manipulation device 132.

Optionally, the cable preparation machine 100 may include a chute 134 for discarding the removed slugs of insulator(s) 152, 154 and/or the removed slugs of cable braid 156 after being cut and removed from the end of the cable 104. The chute 134 transfers the discarded slugs away from the cable preparation zone 112.

Figure 2:
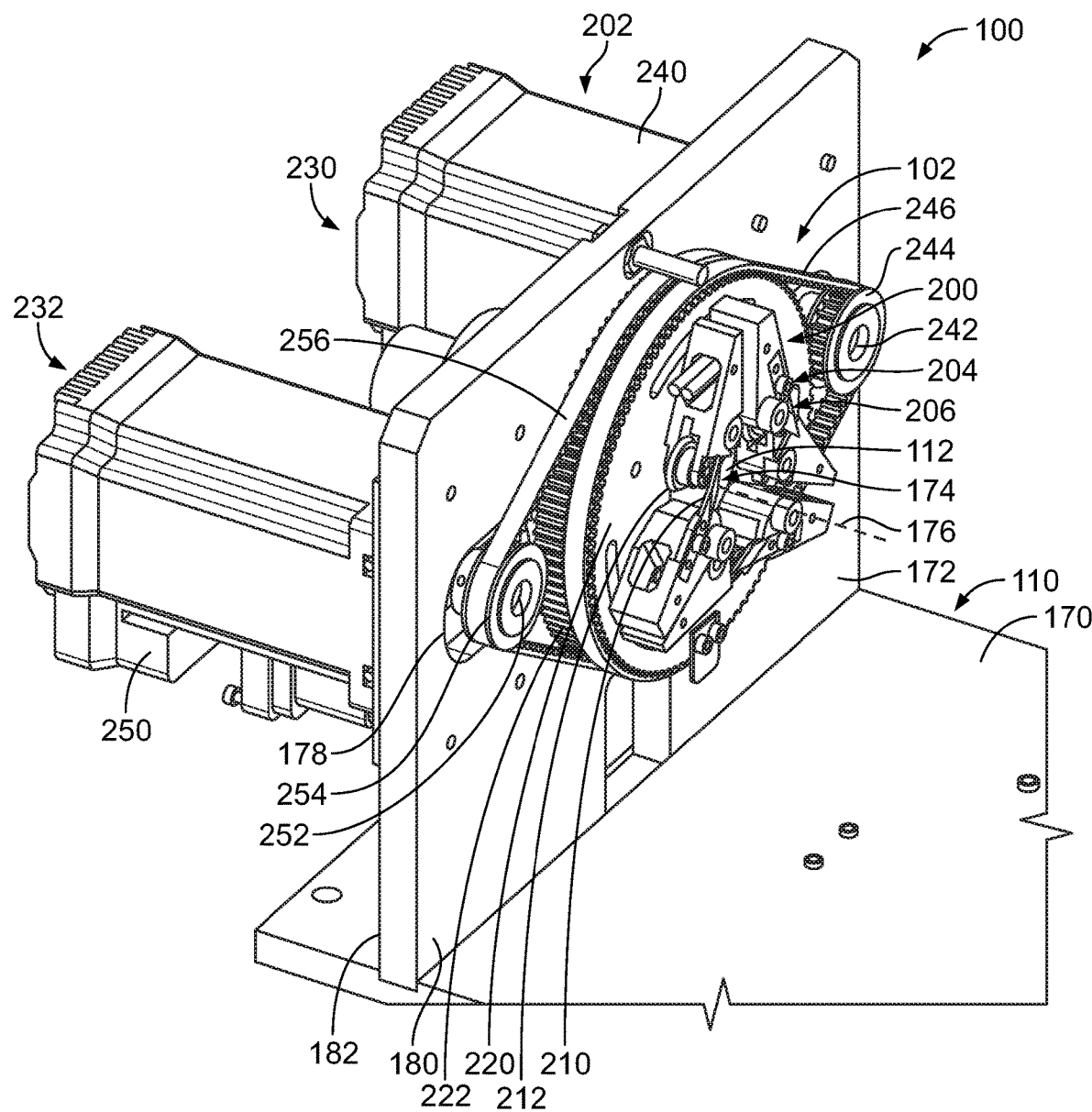
FIG. 2 is a perspective view of a portion of the cable preparation machine 100 showing the cable cutting device 102 in accordance with an exemplary embodiment.

FIG. 2 is a perspective view of a portion of the cable preparation machine 100 showing the cable cutting device 102 in accordance with an exemplary embodiment. FIG. 2 illustrates a base 170 and a support wall 172 of the frame 110 used to support the cable cutting device 102. The support wall 172 of the frame 110 includes a cable opening 174 along a cable axis 176 at the cable preparation zone 112 that receives the end 150 of the cable 104 (shown in FIG. 1).

The support wall 172 of the frame 110 includes drive openings 178 therethrough between a front 180 and a rear 182 of the support wall 172. The drive openings 178 may be located generally on opposite sides of the cable opening 174; however, other locations are possible in alternative embodiments, such as above and/or below the cable opening 174.

The cable cutting device 102 includes a pulley assembly 200, a drive assembly 202 and a blade assembly 204. The pulley assembly 200 is rotatably coupled to the support wall 172 of the frame 110 about the cable axis 176. The pulley assembly 200 is located forward of the front 180 of the support wall 172. The drive assembly 202 is operably coupled to the pulley assembly 200 to rotate the pulley assembly 200 about the cable axis 176. The blade assembly 204 is operably coupled to the pulley assembly 200 and is rotated with the pulley assembly 200 about the cable axis 176. In an exemplary embodiment, the blade assembly 204 is configured to flare the end of the cable braid 156 prior to cutting off the end of the cable braid 156. For example, various blades of the blade assembly 204 pinch against the cable braid 156 to flare outward the end of the cable braid 156, such as to insert the mandrel 128 into the space between the cable braid 156 and the inner insulator 154. In various embodiments, the blade assembly 204 is rotated clockwise and/or counterclockwise while pinching the end of the cable braid 156 to flare the end of the cable braid 156. In various embodiments, the blade assembly 204 is translated relative to the end of the cable braid 156 (for example, the cable 104 is moved forward and/or rearward) to flare the end of the cable braid 156. The translation may occur in addition to or in lieu of the rotation of the blade assembly 204 to flare the end of the cable braid 156.

The blade assembly 204 is configured for cutting the insulator(s) 152, 154 from the end 150 of the cable 104 in a first cutting configuration of the cable cutting device 102 when the cable 104 is positioned in the cable opening 174. Optionally, the blade assembly 204 may be configured for removing the insulator slug that is removed from the cable 104, such as by holding the insulator slug in the cable opening 174 as the cable 104 is drawn forward in the cable opening 174 until the insulator slug falls off the end of the cable 104. The cable 104 may then be repositioned in the cable opening 174, such as for removal of the cable braid 156 or manipulation of the cable braid 156, such as flaring or folding of the cable braid 156.

The blade assembly 204 is configured for cutting the cable braid 156 from the end 150 of the cable 104 in a second cutting configuration of the cable cutting device 102 when the cable 104 is positioned in the cable opening 174. The drive assembly 202, the pulley assembly 200 and the blade assembly 204 are operated differently in the second cutting configuration than the first cutting configuration. Optionally, the blade assembly 204 may be configured for removing the cable braid slug that is removed from the cable 104, such as by holding the cable braid slug in the cable opening 174 as the cable 104 is drawn forward in the cable opening 174 until the cable braid slug falls off the end of the cable 104. The cable 104 may then be repositioned in the cable opening 174, such as for removal of the inner insulator 154 or manipulation of the cable braid 156.

In an exemplary embodiment, the blade assembly 204 includes multiple blades 206 disposed about the cable axis 176. For example, the blades 206 may triangulate the cable 104 within the cable opening 174 during the cutting operations to ensure that the cable 104 remains centered within the cable opening 174 for consistent cutting depth by the blades 206. In an exemplary embodiment, the blade assembly 204 includes a plurality of insulation blades 210 configured for cutting the insulators 152, 154 of the cable 104. In an exemplary embodiment, the blade assembly 204 includes a plurality of braid blades 212 configured for cutting the cable braid 156 of the cable 104. In an exemplary embodiment, the braid blades 212 are used to flare outward the end of the cable braid 156 during a braid manipulation process. In alternative embodiments, the blade assembly 204 may include blades other than cutting blades for manipulating and flaring the cable braid 156. The braid blades 212 are different than the insulation blades 210 for cutting the hard metal cable braid 156 as opposed to cutting the soft plastic insulators 152, 154. In the illustrated embodiment, the insulation blades 210 are fixed blades having a razor-like or a knife-like cutting edge for cutting the insulators 152, 154. In the illustrated embodiment, the braid blades 212 are roller blades that have circular edges that spin during manipulation and cutting of the cable braid 156. Other types of blades may be used for cutting the insulators 152, 154 and/or the cable braid 156 in alternative embodiments.

In an exemplary embodiment, the pulley assembly 200 includes a front pulley 220 operably coupled to a first drive unit 230 of the drive assembly 202 and a rear pulley 222 operably coupled to a second drive unit 232 of the drive assembly 202. The front pulley 220 is forward of the rear pulley 222 and both pulleys 220, 222 are located forward of the front 180 of the support wall 172 of the frame 110. The front pulley 220 is rotatable independent of and relative to the rear pulley 222. For example, the first drive unit 230 may be operated independently of the second drive unit 232. The first drive unit 230 may be operated to rotate the front pulley 220 in a forward direction and in a reverse direction. Similarly, the second drive unit 232 may be operated to rotate the rear pulley 222 in a forward direction and in a rearward direction. During operation, the front pulley 220 may be operated at a different rate than the rear pulley 222 or may be operated at the same rate as the rear pulley 222. In certain operations, the front pulley 220 and the rear pulley 222 may be operated in different directions. In certain operations, the front pulley 220 or the rear pulley 222 may remain stationary while the other of the front pulley 220 or the rear pulley 222 may be operated in a forward direction or a rearward direction. When the front pulley 220 and the rear pulley 222 are operated at different speeds and/or in different directions, the pulley assembly 200 actuates the blade assembly 204, such as for opening or closing the blades 206 around the cable 104. The blades 206 are rotated with the pulley assembly 200 about the cable axis to circumscribe the cable 104 for cutting the cable 104.

In the illustrated embodiment, the first drive unit 230 of the drive assembly 202 includes a first drive motor 240, a first driveshaft 242, a first drive pulley 244 and a first drive belt 246 coupled to the front pulley 220. The drive motor 240 is located rearward of the support wall 172 and the drive pulley 244 is located forward of the support wall 172. The driveshaft 242 passes through the drive opening 178. The drive motor 240 rotates the driveshaft 242, which rotates the drive pulley 244. The drive motor 240 may be rotated in a forward direction or a reverse direction. As the drive pulley 244 is rotated, the drive belt 246 rotates the front pulley 220. In various embodiments, the drive motor 240 may be a stepper motor. In other various embodiments, the drive motor 240 may be a servo motor. Other types of drivers may be used in alternative embodiments, such as a hydraulic driver, a pneumatic driver, or another type of drive unit. Other types of drive systems may be used in alternative embodiments. For example, rather than using the drive belt 246, the drive pulley 244 may define a drive gear directly engaging the front pulley 220.

In the illustrated embodiment, the second drive unit 232 of the drive assembly 202 includes a second drive motor 250, a second driveshaft 252, a second drive pulley 254 and a second drive belt 256 coupled to the rear pulley 222. The drive motor 250 is located rearward of the support wall 172 and the drive pulley 254 is located forward of the support wall 172. The driveshaft 252 passes through the drive opening 178. The drive motor 250 rotates the driveshaft 252, which rotates the drive pulley 254. The drive motor 250 may be rotated in a forward direction or a reverse direction. As the drive pulley 254 is rotated, the drive belt 256 rotates the rear pulley 222. In various embodiments, the drive motor 250 may be a stepper motor. In other various embodiments, the drive motor 250 may be a servo motor. Other types of drivers may be used in alternative embodiments, such as a hydraulic driver, a pneumatic driver, or another type of drive unit. Other types of drive systems may be used in alternative embodiments. For example, rather than using the drive belt 256, the drive pulley 254 may define a drive gear directly engaging the rear pulley 222.

The drive assembly 202 is operated to rotate the pulley assembly 200 about the cable axis 176. The drive assembly 202 rotates the pulley assembly 200 in a first drive configuration to actuate the insulation blades 210, such as to open or close the insulation blades 210 relative to the cable 104. The first drive configuration is used for cutting the outer insulator 152 or the inner insulator 154 of the cable 104. In an exemplary embodiment, when the drive assembly 202 is operated in the first drive configuration, the blade assembly 204 is operated in the first cutting configuration. The drive assembly 202 rotates the pulley assembly 200 in a second drive configuration to actuate the braid blades 212, such as to open or close the braid blades 212 relative to the cable 104. The second drive configuration is used for cutting the cable braid 156 of the cable 104. In an exemplary embodiment, when the drive assembly 202 is operated in the second drive configuration, the blade assembly 204 is operated in the second cutting configuration. In an exemplary embodiment, the drive assembly 202 is operable in another drive configuration for driving the braid blades 212 to manipulate and flare the cable braid 156 during a braid flaring configuration of the blade assembly 204. The insulation blades 210 and the braid blades 212 are rotatable with the pulley assembly 200 around the same cable axis 176.

Figure 3:
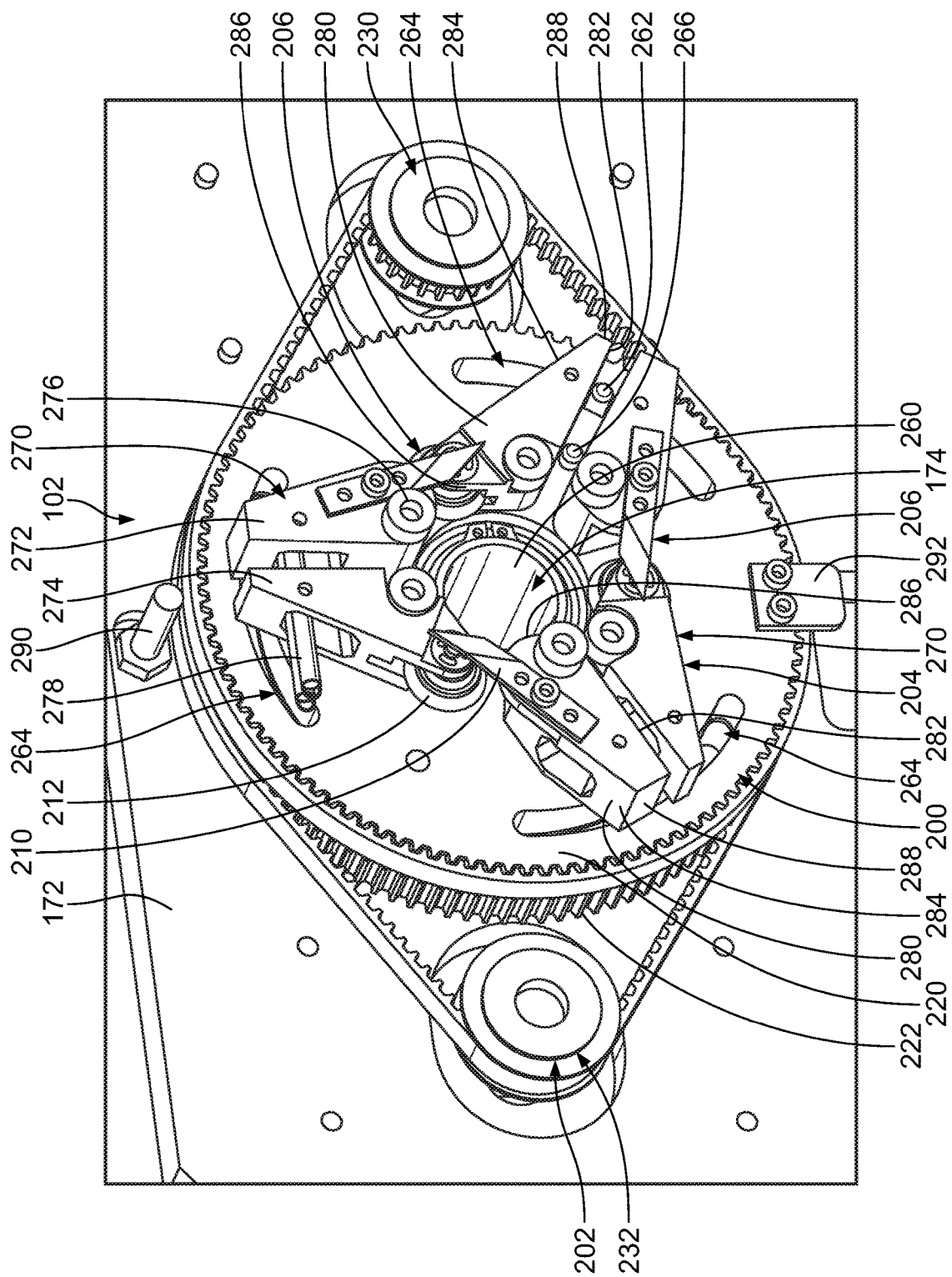
FIG. 3 is a front perspective view of the cable cutting device 102 in accordance with an exemplary embodiment.
Figure 4:
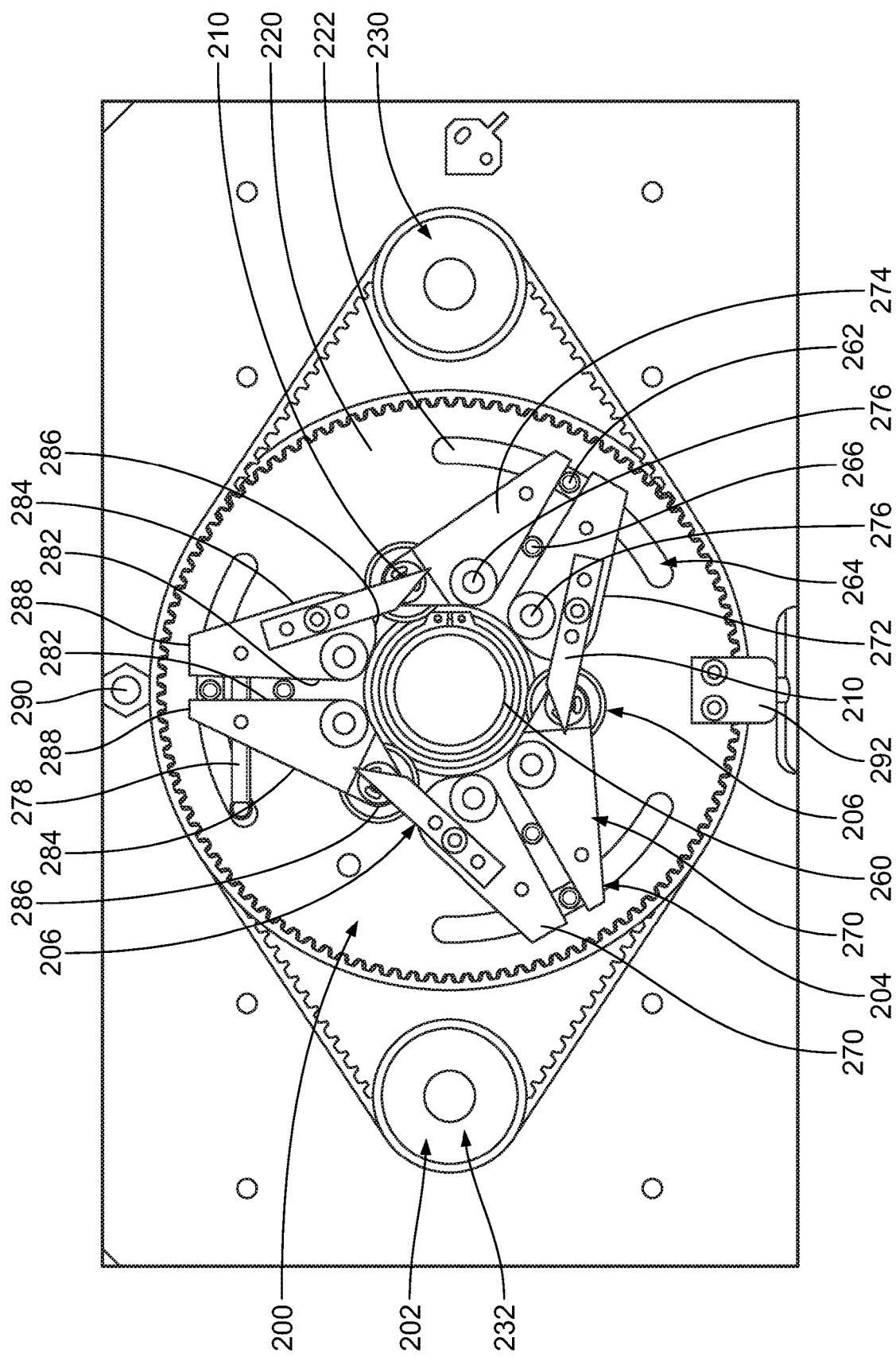
FIG. 4 is a front view of the cable cutting device 102 in accordance with an exemplary embodiment.

FIG. 3 is a front perspective view of the cable cutting device 102 in accordance with an exemplary embodiment. FIG. 4 is a front view of the cable cutting device 102 in accordance with an exemplary embodiment. The pulley assembly 200 includes a hub 260 received in the cable opening 174 of the support wall 172. The hub 260 is hollow and configured to receive the end 150 of the cable 104 (shown in FIG. 1). The front pulley 220 and the rear pulley 222 are rotatable on the hub 260.

The rear pulley 222 includes arm actuation pins 262 extending forward from the rear pulley 222 into slots 264 in the front pulley 220. The arm actuation pins 262 extend through the front pulley 220 to engage the blade assembly 204. The arm actuation pins 262 actuate the blade assembly 204 during operation of the cable cutting device 102. For example, as the front pulley 220 rotates relative to the rear pulley 222, the arm actuation pin 262 engages the blade assembly 204 to actuate the blade assembly 204. In various embodiments, when the front pulley 220 rotates faster than the rear pulley 222, the blade assembly 204 is operated such that the braid blades 212 are actuated. Conversely, when the rear pulley 222 rotates faster than the front pulley 220, the blade assembly 204 is operated such that the insulation blades 210 are actuated.

In an exemplary embodiment, the pulley assembly 200 has a normal position wherein the front pulley 220 is rotationally centered with respect to the rear pulley 222. The front pulley 220 may include hard stop pins 266 extending forward of the front pulley 220 that engage the blade assembly 204 to position the blade assembly 204 in the normal position. The pulley assembly 200 may be operated to advance the insulation blades 210 from the normal position or may be operated to advance the braid blades 212 from the normal position. For example, relative rotation of the front pulley 220 with respect to the rear pulley 222 may cause the insulation blades 210 to advance or may cause the braid blades 212 to advance. The pulley assembly 200 may be operated to retract the insulation blades 210 to the normal position or may be operated to retract the braid blades 212 to the normal position. For example, relative rotation of the front pulley 220 with respect to the rear pulley 222 may cause the insulation blades 210 to retract or may cause the braid blades 212 to retract.

The blade assembly 204 includes arms 270 holding the blades 206. The arms 270 are pivotably coupled to the front pulley 220 of the pulley assembly 200. The arms 270 pivot relative to the front pulley 220 to open or close the corresponding blades 206. In the illustrated embodiment, the arms 270 are arranged in sets, each set including a first arm 272 and a second arm 274. The first arm 272 holds the corresponding insulation blades 210 for cutting the insulators 152, 154 and the second arm 274 holds the corresponding braid blade 212 for cutting the cable braid 156. In the illustrated embodiment, the blade assembly 204 includes three sets of the arms 270 with each set of arms 270 holding the corresponding insulation blade 210 and the corresponding braid blade 212. For example, the blade assembly 204 includes three of the first arms 272 holding the insulation blades 210 and includes three of the second arms 274 holding the braid blades 212. The three sets of arms 272, 274 triangulate the blades 206 around the cable opening 174. Greater or fewer sets of arms 272, 274 may be provided in alternative embodiments. In other alternative embodiments, rather than sets of arms 272, 274, the blade assembly 204 may be provided with single arms 270 that each holds an insulation blade 210 and a braid blade 212. Forward rotation of such arms 270 may actuate the insulation blade 210 for cutting the insulators 152, 154, whereas rearward rotation of such arms 270 may actuate the braid blade 212 for cutting the cable braid 156.

The arms 270 are pivotably coupled to the front pulley 220 by an arm pivot pin 276. The arms 270 are pivoted relative to the front pulley 220 of the pulley assembly 200 to change a cutting depth of the corresponding blade 206 (for example, the insulation blade 210 or the braid blade 212). For example, the relative movement (for example, angular position) of the front pulley 220 relative to the rear pulley 222 determines the amount of pivot of the arm 270, and thus the location of the blade 206 relative to the cable opening 174 to control the position of the blade 206. The cable cutting device 102 may accommodate cables 104 of various diameters by changing the cutting depth of the blades 206. In an exemplary embodiment, the arm pivot pin 276 is offset from the arm actuation pin 262. When the arm actuation pin 262 engages and drives against the arm 270, the arm 270 is pivoted about the arm pivot pin 276 to close the blade 206 for cutting the cable 104.

The arm actuation pin 262 causes the arm 270 to pivot when the front pulley 220 is rotated at a different rate than the rear pulley 222. For example, in a first drive configuration, the front pulley 220 is rotated at a faster rate than the rear pulley 222 to actuate the blade assembly 204. For example, depending on the location of the arm actuation pin 262 in the slot 264, the pulley assembly 200 may be used to advance the insulation blade 210 from the normal position for closing the insulation blade 210 on the cable 104 for cutting/manipulating the insulator 152 or 154 or may be used to retract (for example, open) the braid blade 212 from a closed position back to the normal position in the first drive configuration. In a second drive configuration, the rear pulley 222 is rotated at a faster rate than the front pulley 220 to actuate the blade assembly 204. For example, depending on the location of the arm actuation pin 262 and the slot 264, the pulley assembly 200 may be used to advance the braid blade 212 from the normal position for closing the braid blade 212 on the cable 104 for cutting/manipulating/flaring the cable braid 156 or may be used to retract (for example, open) the insulation blade 210 from a closed position back to the normal position in the second drive configuration. In a third drive configuration, the front pulley 220 and the rear pulley 222 are rotated at the same rate. In the third drive configuration, the arm 270 remains stationary relative to the front pulley 220 and thus does not open or close when the front pulley 220 is rotated at the same speed as the rear pulley 222. The blade 206 may be held at a constant depth and rotated with the front pulley 220 when the front pulley 220 and the rear pulley 222 are rotated at the same speed.

In an exemplary embodiment, each arm 270 is coupled to an arm return spring 278. The arm return spring 278 biases the arm 270 to an open position. As the arm actuation pin 262 is retracted, the arm return spring 278 opens or returns the arm 270 to the normal position against the hard stop pin 266. The hard stop pin 266 holds the arm 270 in the normal position. The arm return spring 278 returns the arm 270 to a position where the arm 270 engages the hard stop pin 266, defining the normal position. The arm 270 is unable to open further than the normal position because the arm 270 bottoms out against the hard stop pin 266. In the illustrated embodiment, each set of arms 270 includes a corresponding arm return spring 278 coupled between the first arm 272 and the second arm 274 of the set of arms.

In operation, when the front pulley 220 is rotated in a first direction, the arm actuation pin 262 presses against the first arm 272 to actuate the first arm 272 and close the insulation blades 210 around the cable 104. The hard stop pins 266 hold the second arms 274 in the normal position. The arm return spring 278 is stretched as the first arm 272 pivots away from the second arm 274. When the front pulley 220 is rotated in an opposite second direction, the arm actuation pin 262 moves back toward the second arm 274 and the arm return spring 278 returns the first arm 272 to the normal position where the first arm 272 abuts against the hard stop pin 266. Further rotation of the front pulley 220 in the second direction causes the arm actuation pin 262 to press against the second arm 274 to actuate the second arm 274 and close the braid blades 212 around the cable 104. The hard stop pins 266 hold the first arms 272 in the normal position. The arm return spring 278 is stretched as the second arm 274 pivots away from the first arm 272. When the front pulley 220 is rotated in the opposite first direction, the arm actuation pin 262 moves back toward the first arm 272 and the arm return spring 278 returns the second arm 274 to the normal position where the second arm 274 abuts against the hard stop pin 266.

In an exemplary embodiment, each arm 270 includes a body 280 extending between a first side 282 and a second side 284. The body 280 extends between an inner end 286 and an outer end 288. The first sides 282 of the first and second arms 272, 274 face each other. The first sides 282 face the hard stop pins 266 and the arm actuation pins 262. In the normal positions, the first sides 282 abut against the hard stop pins 266. In the illustrated embodiment, the arm pivot pin 276 is located proximate to the first side 282 and proximate to the inner end 286. Other locations are possible in alternative embodiments. In the illustrated embodiment, the arm return spring 278 is located proximate to the outer end 288. Other locations are possible in alternative embodiments. The arm return springs 278 may be coupled to the front pulley 220 rather than between the arms 270 in alternative embodiments. In the illustrated embodiment, the arm actuation pin 262 engages the first sides 282 of the first and second arms 272, 274 proximate to the outer ends 288. Other locations are possible in alternative embodiments. In the illustrated embodiment, the insulation blade 210 is mounted to the first arm 272 proximate to the second side 284 at the inner end 286. The insulation blade 210 extends inward from the inner end 286. When the first arm 272 is pivoted, the cutting edge of the insulation blade 210 is closed inward toward the cable opening 174 to engage and cut the cable 104. In the illustrated embodiment, the braid blade 212 is mounted to the second arm 274 proximate to the second side 284 at the inner end 286. The braid blade 212 extends inward from the inner end 286. When the second arm 274 is pivoted, the cutting edge of the braid blade 212 is closed inward toward the cable opening 174 to engage and cut the cable 104.

In an alternative embodiment, rather than having first and second arms 272, 274, the blade assembly 204 may include single arms 270 each holding one of the insulation blades 210 and one of the braid blades 212. For example, rather than having the arms 270 split down the middle at the location of the hard stop pins 266 and the arm actuation pins 262, the first and second arms 272, 274 may be part of a single unitary body having a pocket or opening that receives the arm actuation pin 262. When the single arm is pivoted in the first direction, the insulation blade 210 is moved closer to the cable opening 174 to close the insulation blade 210 on the cable 104 and the braid blade 212 is moved further from the cable opening 174. When the single arm is pivoted in the second direction, the braid blade 212 is moved closer to the cable opening 174 to close the braid blade 212 on the cable 104 and the insulation blade 210 is moved further from the cable opening 174.

In an exemplary embodiment, the drive assembly 202 includes a position sensor assembly for sensing a rotational position of the pulley assembly 200. For example, the position sensor assembly includes a fixed position sensor 290 and a rotating position sensor 292. In the illustrated embodiment, the rotating position sensor 292 is fixed to the front pulley 220 and rotates relative to the fixed position sensor 290 with the front pulley 220. The fixed position sensor 290 senses a rotational position of the front pulley 220 based on the location of the rotating position sensor 292. For example, the fixed position sensor 290 may be a proximity sensor. Optionally, the rear pulley 222 may additionally or alternatively hold the rotating position sensor 292 to sense a position of the rear pulley 222. Other types of position sensors may be used to determine the rotational positions of the front pulley 220 and/or the rear pulley 222. In other various embodiments, the drive motors 240, 250 may be servo motors having internal position sensors for determining rotational positions of the drive units 230, 232 to determine the corresponding rotational positions of the front and rear pulleys 220, 222.

Figure 5:
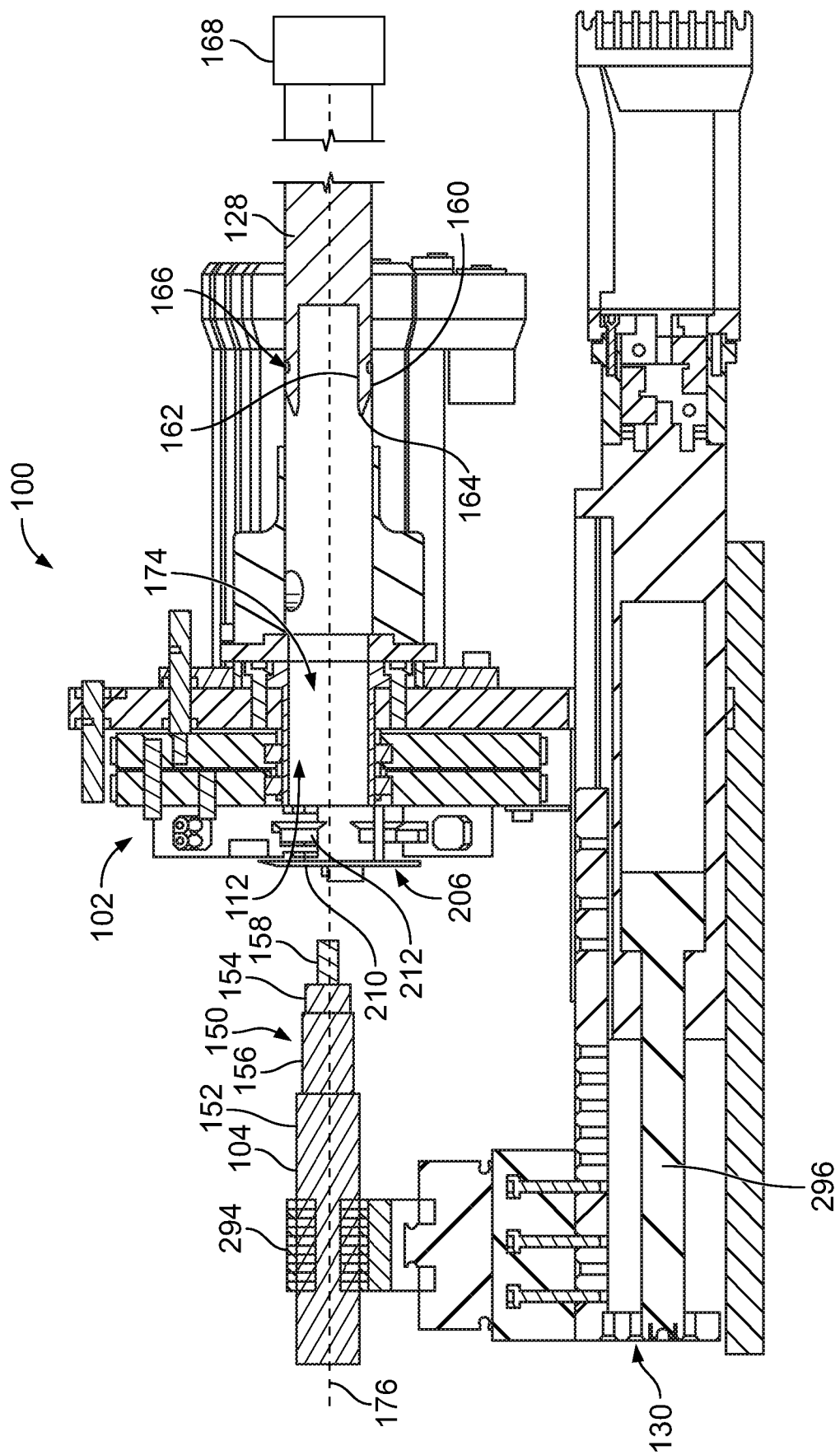
FIG. 5 is a partial sectional view of a portion of the cable preparation machine 100 showing the cable cutting device 102, the cable holder 130 and the mandrel 128.

FIG. 5 is a partial sectional view of a portion of the cable preparation machine 100 showing the cable cutting device 102, the cable holder 130 and the mandrel 128. The mandrel 128 is configured to be inserted onto the end of the cable 104 for cutting the cable braid 156. For example, the mandrel 128 may be inserted between the cable braid 156 and the inner insulator 154 after the cable braid 156 is flared outward. The mandrel 128 is hollow and receives the inner insulator 154 and the inner conductor 158. The mandrel 128 includes an outer surface 160 and an inner surface 162 that receives the inner insulator 154. In an exemplary embodiment, an edge 164 of the mandrel 128 is chamfered to aide in inserting the mandrel 128 in the gap between the inner insulator 154 and the cable braid 156. For example, the mandrel 128 may be chamfered at the inner surface 162 and/or the outer surface 160.

The outer surface 160 of the mandrel 128 provides a hard surface for supporting the cable braid 156 during the cutting operation. For example, the braid blades 212 may press inward during cutting the cable braid 156 against the mandrel 128 to cut through the strands of the cable braid 156. Optionally, the mandrel 128 includes a shear feature 166 that aides in cutting the strands of the cable braid 156. For example, the shear feature 166 may be a groove around the outer surface 160 of the mandrel 128. The groove has an edge used to shear the strands of the cable braid 156 during the cutting process.

In an exemplary embodiment, the mandrel 128 is operably coupled to a carriage 168 that moves the mandrel 128 relative to the cable opening 174. The carriage 168 slides the mandrel 128 forward and rearward along the cable axis 176 during operation. For example, after the cable braid 156 is flared outward, the mandrel 128 is moved forward onto the end 150 of the cable 104. The inner insulator 154 is loaded into the hollow core of the mandrel 128. Once the mandrel 128 is positioned under the cable braid 156, the blade assembly 204 is used to cut the cable braid 156 against the outer surface 160 of the mandrel 128. The mandrel 128 may be moved rearward after the end of the cable braid 156 is cut off. Optionally, the rearward movement of the mandrel 128 may be coordinated to remove or discard the removed slug of the cable braid 156. The mandrel 128 may be coupled to the end of the cable 104 by other devices or by other movements in alternative embodiments and is not necessarily movable along the cable axis 176 in alternative embodiments.

The cable holder 130 includes a chuck 294 for holding the cable 104. The cable holder 130 includes a slide 296 from moving the chuck 294 toward and away from the cable cutting device 102. Once the cable 104 is secured in the chuck 294, the slide 296 moves the end 150 of the cable 104 into the cable opening 174 at the cable preparation zone 112. In an exemplary embodiment, the cable holder 130 may move the cable 104 while the cable cutting device 102 is being operated. For example, the cable 104 may be moved forward or rearward while the cable cutting device 102 rotates the blade assembly 204 around the cable axis 176. The cable cutting device 102 may be operated with the cable 104 remaining in the cable opening 174 to remove the various layers of the cable 104 to prepare the end of the cable 104. For example, the cable cutting device 102 is configured to remove a portion of the outer insulator 152, a portion of the cable braid 156 and a portion of the inner insulator 154 to expose the inner conductor 158 and to expose the cable braid 156 for termination of the cable 104 to another component. The cable cutting device 102 is able to remove each of the layers of the cable 104 without removing the cable 104 from the cable preparation machine 100. A single cable preparation machine 100 is able to perform multiple processing steps using the cable cutting device 102. Because the cable cutting device 102 includes two different types of the blades 206, such as the insulation blades 210 and the braid blades 212, the cable cutting device 102 is able to process the cable 104 in a cost effective and reliable manner without the need for multiple machines or time-consuming transferring of the cable 104 between different machines.

Figure 6:
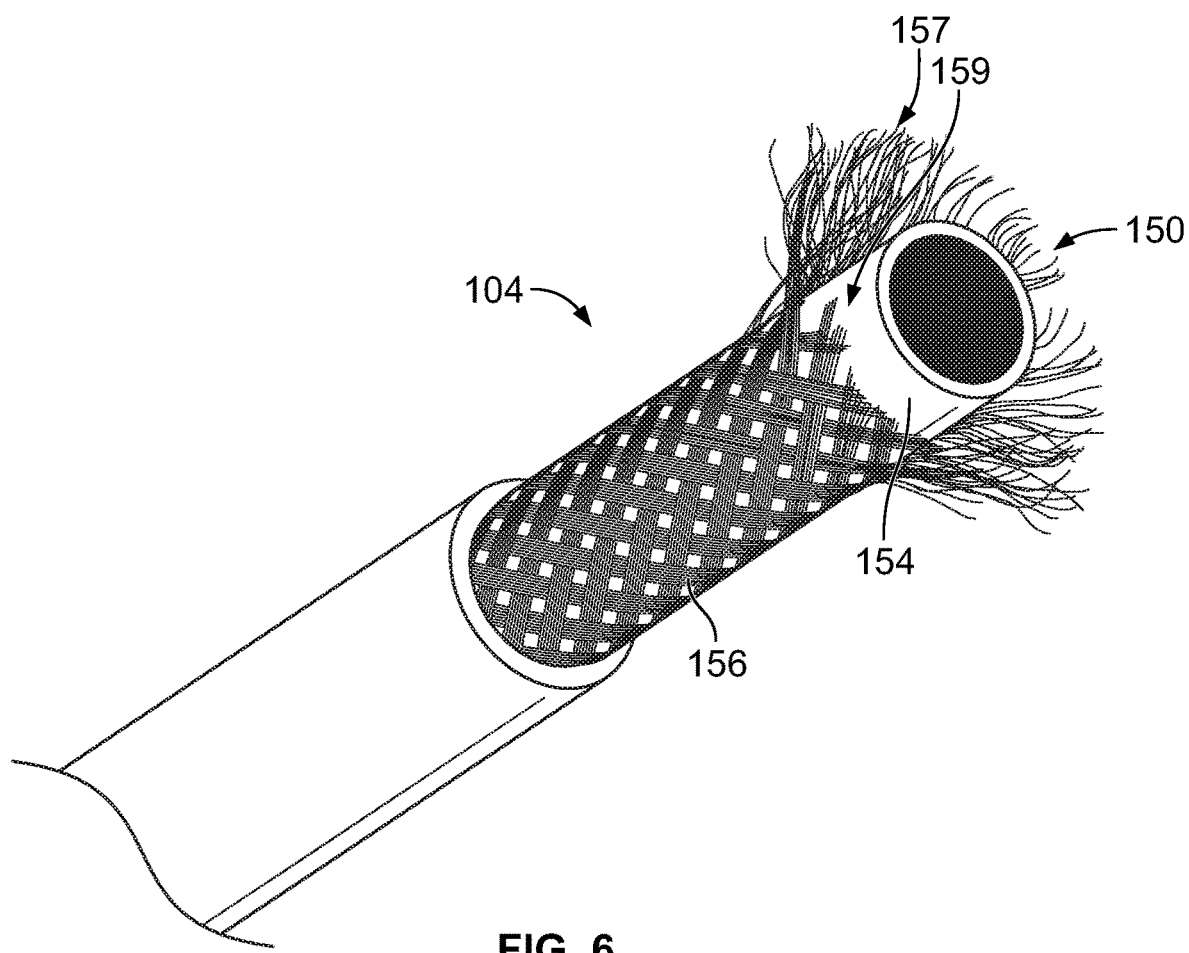
FIG. 6 illustrates the end 150 of the cable 104 showing an end 157 of the cable braid 156 flared outward.

FIG. 6 illustrates the end 150 of the cable 104 showing an end 157 of the cable braid 156 flared outward. A gap 159 is formed between the end 157 of the cable braid 156 and the inner insulator 154 area the mandrel 128 is configured to received in the gap 159 during processing of the cable 104. The strands of the cable braid 156 are spread apart to flare the end 157 of the cable braid 156. In an exemplary embodiment, the cable braid 156 is pinched inward by the braid blades 212 (shown in FIG. 2) against the inner insulator 154 to flare the end 157 of the cable braid 156. Optionally, the braid blades 212 may be rotated about the cable braid 156 while pinching inward to flare the end 157 of the cable braid 156. The braid blades 212 may be rotated clockwise and/or counterclockwise to flare the end 157 of the cable braid 156. Optionally, the cable 104 may be translated along the cable axis while the braid blades 212 are pinching inward on the cable braid 156 to flare the end 157 of the cable braid 156. The translation of the cable 104 may occur while rotating the braid blades 212 about the cable braid 156.

Figure 7:
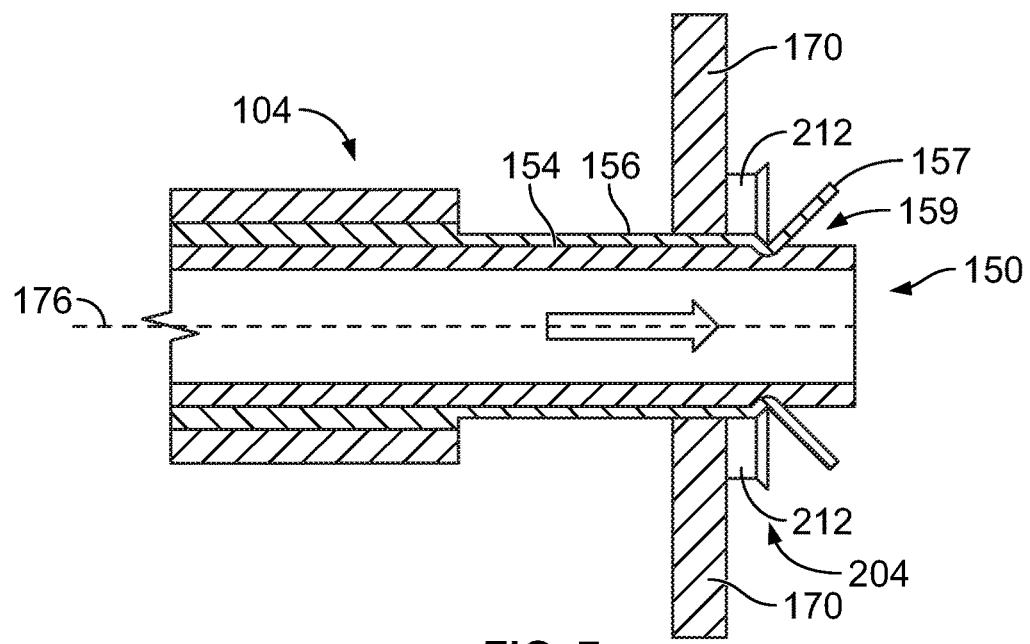
FIG. 7 illustrates the braid blades 212 flaring the end 157 of the cable braid 156.
Figure 8:
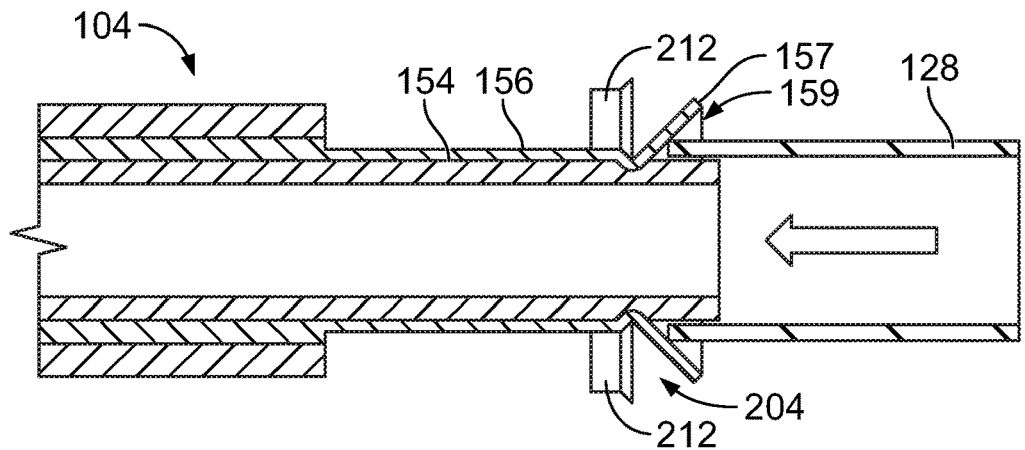
FIG. 8 illustrates the mandrel 128 being inserted onto the end 150 of the cable 104 with the braid blades 212 holding the cable braid 156.
Figure 9:
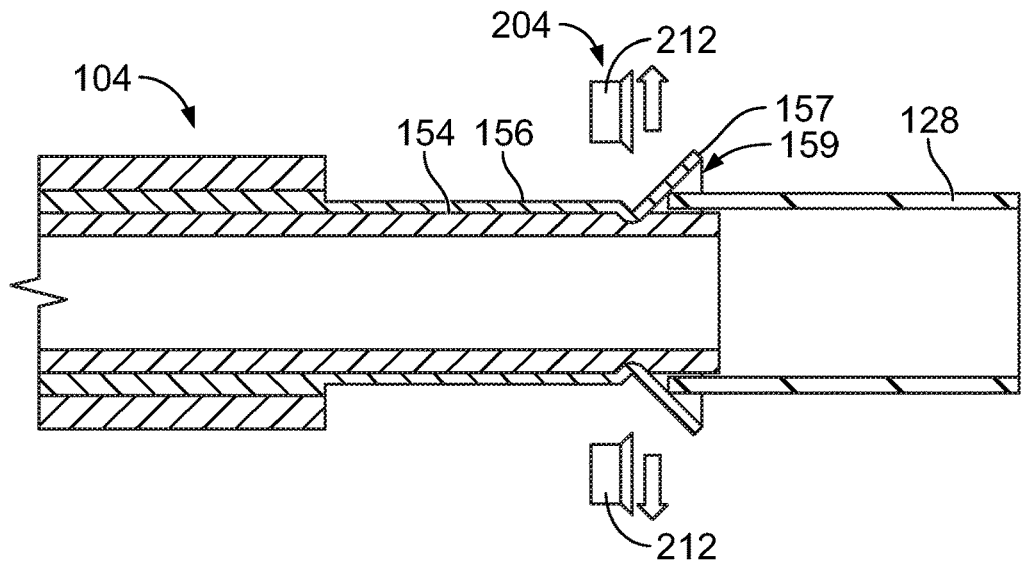
FIG. 9 illustrates the mandrel 128 being inserted onto the end 150 of the cable 104 with the braid blades 212 spaced apart from the cable braid 156.
Figure 10:
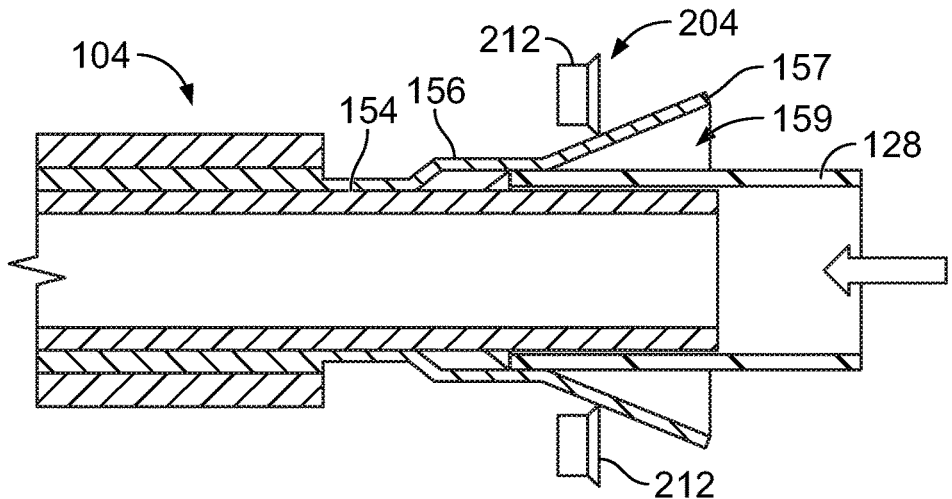
FIG. 10 illustrates the mandrel 128 partially inserted onto the end 150 of the cable 104.
Figure 11:
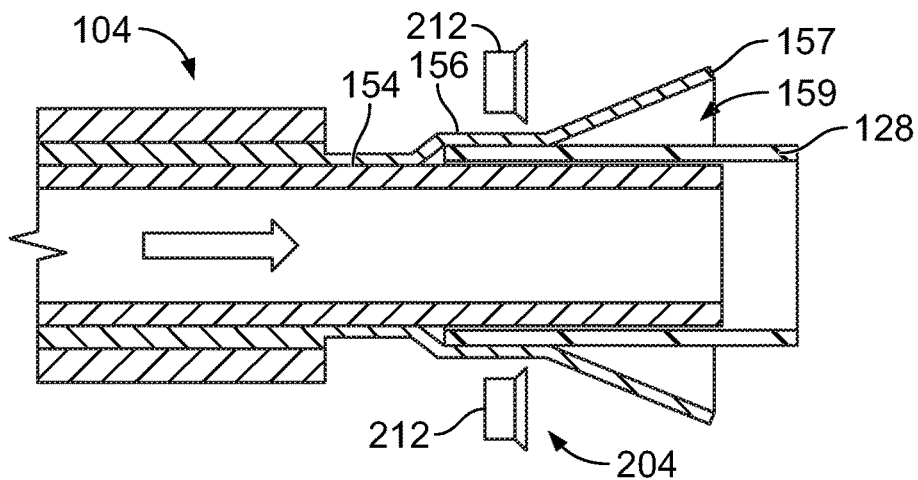
FIG. 11 illustrates the mandrel 128 fully inserted onto the end 150 of the cable 104.
Figure 12:
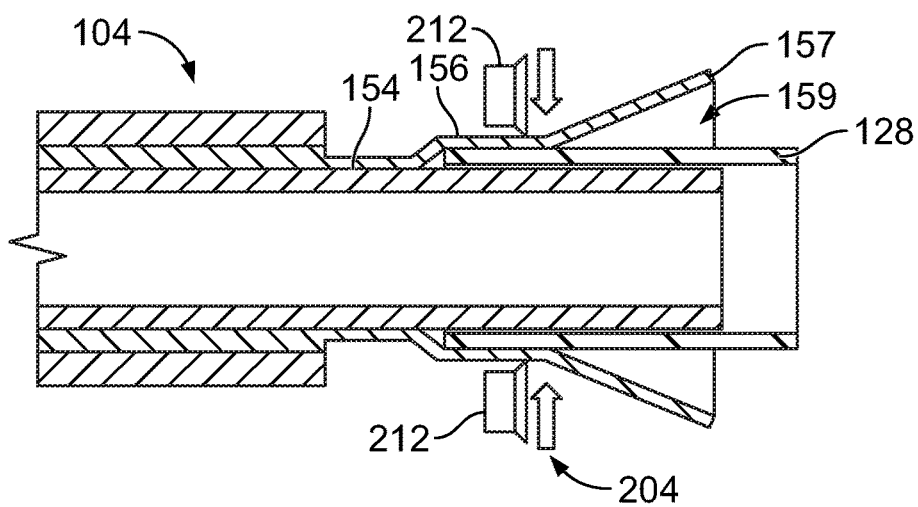
FIG. 12 illustrates the braid blades 212 cutting the cable braid 156.
Figure 13:
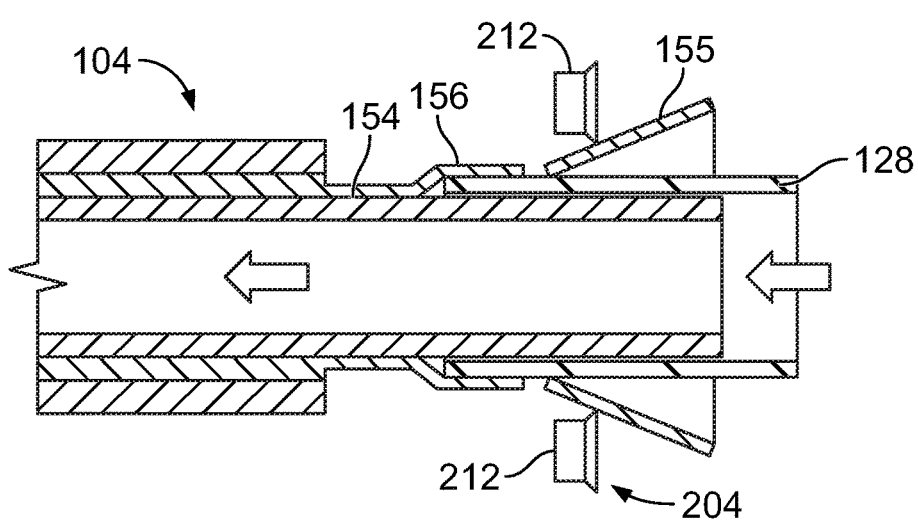
FIG. 13 illustrates the cut slug of the cable braid 156 partially removed from the end of the cable 104.

FIGS. 7-16 illustrate various processing steps for cutting the end 157 of the cable braid 156. FIG. 7 illustrates the braid blades 212 flaring the end 157 of the cable braid 156. FIG. 8 illustrates the mandrel 128 being inserted onto the end 150 of the cable 104 with the braid blades 212 holding the cable braid 156. FIG. 9 illustrates the mandrel 128 being inserted onto the end 150 of the cable 104 with the braid blades 212 spaced apart from the cable braid 156. FIG. 10 illustrates the mandrel 128 partially inserted onto the end 150 of the cable 104. FIG. 11 illustrates the mandrel 128 fully inserted onto the end 150 of the cable 104. FIG. 12 illustrates the braid blades 212 cutting the cable braid 156. FIG. 13 illustrates the cut slug of the cable braid 156 partially removed from the end of the cable 104. FIG. 14 illustrates the cut slug of the cable braid 156 partially removed from the end of the cable 104. FIG. 15 illustrates the cut slug of the cable braid 156 removed from the end of the cable 104. FIG. 16 illustrates the cut slug of the cable braid 156 discarded from the end of the cable 104.

During the cable flaring operation (FIG. 7), the blade assembly 204 is used to flare the end 157 of the cable braid 156. The braid blades 212 pinch inward on the cable braid 156 to flare the cable braid 156. Optionally, the blade assembly 204 may be rotated about the cable axis 176 to cause the strands of the cable braid 156 to separate and further flare outward. In an exemplary embodiment, the cable 104 may be translated rearward to lengthen the end 157 of the cable braid 156 that is flared, which increases the diameter of the flare of the cable braid 156.

After the cable braid 156 is flared outward, the mandrel 128 is loaded (FIG. 8) onto the end of the cable 104 in the gap 159 between the cable braid 156 and the inner insulator 154. In an exemplary embodiment, the braid blades 212 are moved to pinching positions where the braid blades 212 engage the cable braid 156 when the mandrel 128 is initially loaded into the gap 159. For example, the braid blades 212 may pinch against the cable braid 156 to hold the cable braid 156 from being pushed rearward as the mandrel 128 is loaded into the gap 159. Optionally, the braid blades 212 may engage the cable braid 156 at the base of the flared section. Alternatively, the braid blades 212 may engage the cable braid 156 along the flared section. In an exemplary embodiment, after the mandrel 128 is initially loaded onto the end of the cable 104 in the gap 159, the braid blades 212 are retracted away from the cable braid 156 to clearance positions (FIG. 9) to provide clearance and allow the mandrel 128 to be further advanced onto the end of the cable 104. For example, the mandrel 128 may be advanced beyond the base of the flared section to a fully loaded position.

FIG. 10 illustrates the mandrel 128 advanced forward of the braid blades 212 on the end of the cable 104. The flared section provides a funneled area of the cable braid 156 that allows the mandrel 128 to be initially loaded into the gap 159. Once the mandrel 128 is loaded forward of the end of the cable braid 156, the mandrel 128 may be pushed onto the end of the cable 104 between the cable braid 156 and the inner insulator 154 to force the cable braid 156 outward for loading the mandrel 128 onto the cable 104. In an exemplary embodiment, the braid blades 212 may engage the flared section of the cable braid 156 to support and hold the flared section of the cable braid 156 is the mandrel 128 is loaded into the gap 159. Optionally, the cable 104 may additionally or alternatively be moved relative to the mandrel 128 and the braid blades 212, such as in a rearward direction (FIG. 11). Rearward movement of the cable 104 has the same effect as moving the mandrel 128 forward to further pack the mandrel 128 into the gap 159.

Once the mandrel 128 is positioned relative to the cable 104, the cable cutting device 102 is used to cut the cable braid 156. The braid blades 212 are closed around the cable braid 156 to cutting positions (FIG. 12). For example, the arms 270 are pivoted to the advanced positions to close the braid blades 212 around the cable braid 156. In the cutting positions, the braid blades 212 press against the cable braid 156 such that the cable braid 156 may be cut against the mandrel 128. The shear feature 166 cooperates with the braid blades 212 to cut the cable braid 156. The arms 270 may be moved between the retracted positions and the advanced positions by rotating the blade assembly 204 about the cable axis 176 onto the cable braid 156. Optionally, the positioning of the arms 270 is electronically controlled to control a depth of cutting of the braid blades 212 on the cable braid 156. For example, the drive assembly 202 may be used to electronically control the pulley assembly 200 to control the positions of the arms 270, and thus the depth of cutting of the braid blades 212. In other various embodiments, the positioning of the arms 270 may be controlled based on cutting force of the braid blades 212 against the cable braid 156. For example, sensors may be provided within the system to measure the force of the braid blades 212 on the cable braid 156. The arms 270 may be advanced until a predetermined force of the braid blades 212 against the cable braid 156 is achieved. The blade assembly 204 is configured to cut the cable braids 156 of different diameter cables 104 by controlling the depths of the braid blades 212 at the advanced positions. In an exemplary embodiment, different diameter mandrels correspond to the different diameter cables. When a different diameter cable is used, the mandrel 128 may be replaced with a different diameter mandrel 128 for loading onto the end of the different diameter cable.

After the cable braid 156 is cut, the end 157 of the cable braid 156 forms a removable slug 155 configured to be removed from the end of the cable 104 (FIG. 13). The cable 104 may be moved forward to separate the slug 155 from the cable braid 156. Optionally, the mandrel 128 may be moved forward with the cable 104 to position the removable slug 155 relative to the mandrel 128. In various embodiments, the braid blades 212 may be held in pinching positions (FIG. 14) on the removable slug 155 to hold the removable slug as the cable 104 is moved forward. For example, in the removable slug 155 may be pinched against the mandrel 128 as the cable 104 is moved forward.

In an exemplary embodiment, to discard the slug 155, the cable 104 is moved forward and the mandrel 128 is moved rearward (FIG. 15). The braid blades 212 may hold the slug 155 as the cable 104 is moved forward and the mandrel 128 is moved rearward. Once the cable 104 is clear of the slug 155 and the mandrel is clear of the slug 155, the slug 155 may be discarded (FIG. 16).

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable preparation machine comprising:
   a blade assembly having a plurality of arms and braid blades mounted to the corresponding arms, the arms and the braid blades being disposed about a cable opening configured to receive an end of a cable therein along a cable axis, the arms being movable relative to each other between retracted positions and advanced positions, the arms moving the braid blades closer to each other within the cable opening as the arms are moved from the retracted positions to the advanced positions, the braid blades having edges configured to engage a cable braid of the cable to cut the cable braid; and
   a mandrel coupled to the end of the cable between the cable braid and an inner insulator of the cable, the mandrel including a shear feature defined by an outer surface of the mandrel, wherein the edges are closed toward the shear feature to cut the cable braid between the braid blades and the shear feature;
   wherein the braid blades are rotated around the cable axis pressing the cable braid between the edges of the braid blades and the mandrel to cut the cable braid.

2. The cable preparation machine of claim 1, wherein the shear feature is a groove in the mandrel, the braid blades being rotated around the groove to cut the cable braid.

3. The cable preparation machine of claim 1, further comprising a pulley assembly rotatably coupled to a frame about the cable axis and a drive assembly operably coupled to the pulley assembly to rotate the pulley assembly about the cable axis, the blade assembly being operably coupled to the pulley assembly and rotated with the pulley assembly about the cable axis.

4. The cable preparation machine of claim 1, wherein the braid blades are positionable by the arms in clearance positions, cutting positions, and pinching positions, the braid blades engaging the cable braid in the pinching positions, the pinching positions being moved relative to the cutting positions, the braid blades being moved to the pinching positions after the cable braid is cut to hold the removed slugs of the cable braid while the cable is removed from the cable opening to discard the removed slugs from the end of the cable.

5. The cable preparation machine of claim 1, wherein the arms are moved between the retracted positions and the advanced positions by rotating the blade assembly about the cable axis.

6. The cable preparation machine of claim 1, wherein positioning of the arms is electronically controlled to control a depth of cutting of the braid blades on the cable braid.

7. The cable preparation machine of claim 1, wherein positioning of the arms is controlled based on cutting force of the braid blades against the cable braid.

8. The cable preparation machine of claim 1, wherein an edge of the mandrel inserted onto the end of the cable is chamfered.

9. The cable preparation machine of claim 1, wherein the blade assembly is configured to cut cable braids of different diameter cables by controlling depths of the braid blades at the advanced positions and by using different diameter mandrels corresponding to the different diameter cables.

10. The cable preparation machine of claim 1, wherein the braid blades are disposed equidistant around the cable opening to center the cable within the cable opening.

11. A cable preparation machine comprising:
a blade assembly having a plurality of arms and braid blades mounted to the corresponding arms, the arms and the braid blades being disposed about a cable opening configured to receive an end of a cable therein along a cable axis, the arms being movable relative to each other between retracted positions and advanced positions, the arms moving the braid blades closer to each other within the cable opening as the arms are moved from the retracted positions to the advanced positions, the braid blades having edges configured to engage a cable braid of the cable to cut the cable braid; and
a mandrel coupled to the end of the cable between the cable braid and an inner insulator of the cable;
wherein the braid blades are positionable by the arms in clearance positions, cutting positions, and pinching positions, the braid blades engaging the cable braid in the pinching positions, the pinching positions being moved relative to the cutting positions, the braid blades being moved to the pinching positions to hold the cable braid as the mandrel is inserted onto the end of the cable, wherein the braid blades are rotated around the cable axis pressing the cable braid between the edges of the braid blades and the mandrel to cut the cable braid in the cutting positions.

12. A cable preparation machine comprising:
a blade assembly having a plurality of arms and braid blades mounted to the corresponding arms, the arms and the braid blades being disposed about a cable opening configured to receive an end of a cable therein along a cable axis, the arms being movable relative to each other between retracted positions and advanced positions, the arms moving the braid blades closer to each other within the cable opening as the arms are moved from the retracted positions to the advanced positions, the braid blades having edges configured to engage a cable braid of the cable to cut the cable braid; and
a mandrel coupled to the end of the cable between the cable braid and an inner insulator of the cable;
wherein the braid blades are positionable by the arms in clearance positions, cutting positions, and pinching positions, the braid blades engaging the cable braid in the pinching positions, the pinching positions being moved relative to the cutting positions, the braid blades being moved to the pinching positions to flare the cable braid outward prior to inserting the mandrel on to the end of the cable, the braid blades being rotated around the cable axis pressing the cable braid between the edges of the braid blades and the mandrel to cut the cable braid in the cutting positions.

13. A cable preparation machine comprising:
a blade assembly having a plurality of arms and braid blades mounted to the corresponding arms, the arms and the braid blades being disposed about a cable opening configured to receive an end of a cable therein along a cable axis, the arms being movable relative to each other between retracted positions and advanced positions, the arms moving the braid blades closer to each other within the cable opening as the arms are moved from the retracted positions to the advanced positions, the braid blades having edges configured to engage a cable braid of the cable, the braid blades being advanced in a first advancing configuration by the arms to pinch the cable braid inward against an inner insulator of the cable and flare outward an end of the cable braid forward of the braid blades, the braid blades being advanced in a second advancing configuration by the arms at a different location relative to the cable to cut the cable braid; and
a mandrel coupled to the end of the cable after the cable braid has been flared and before the cable braid has been cut, the mandrel being positioned between the cable braid and the inner insulator of the cable;
wherein the braid blades are rotated around the cable axis pressing the cable braid between the edges of the braid blades and the mandrel to cut the cable braid.

14. The cable preparation machine of claim 13, wherein the mandrel includes a shear feature, the edges being closed toward the shear feature to cut the cable braid between the braid blades and the shear feature.

15. The cable preparation machine of claim 13, wherein the braid blades are positionable by the arms in clearance positions, cutting positions and pinching positions, the braid blades engaging the cable braid in the pinching positions, the pinching positions being moved relative to the cutting positions.

16. The cable preparation machine of claim 13, further comprising a pulley assembly rotatably coupled to a frame about the cable axis and a drive assembly operably coupled to the pulley assembly to rotate the pulley assembly about the cable axis, the blade assembly being operably coupled to the pulley assembly and rotated with the pulley assembly about the cable axis.

17. The cable preparation machine of claim 13, wherein the braid blades are positionable by the arms in clearance positions, cutting positions, and pinching positions, the braid blades engaging the cable braid in the pinching positions, the pinching positions being moved relative to the cutting positions, the braid blades being moved to the pinching positions to flare the cable braid outward prior to inserting the mandrel on to the end of the cable.

18. A cable preparation machine comprising:
a frame forming a cable cutting zone, the frame having a cable opening along a cable axis at the cable cutting zone receiving an end of a cable;
a pulley assembly rotatably coupled to the frame about the cable axis;

a drive assembly operably coupled to the pulley assembly to rotate the pulley assembly about the cable axis;

a blade assembly operably coupled to the pulley assembly and rotated with the pulley assembly about the cable axis, the blade assembly includes a plurality of arms and braid blades mounted to the corresponding arms, the arms and the braid blades being disposed about the cable opening along the cable axis, the arms being movable relative to the pulley assembly between retracted positions and advanced positions, the arms moving the braid blades closer to each other within the cable opening as the arms are moved from the retracted positions to the advanced positions, the braid blades having edges configured to engage a cable braid of the cable to cut the cable braid; and a mandrel coupled to the frame and being positionable on the end of the cable between the cable braid and an inner insulator of the cable;

wherein the braid blades are rotated around the cable axis pressing the cable braid between the edges of the braid blades and the mandrel to cut the cable braid.

19. The cable preparation machine of claim 18, wherein the pulley assembly includes a front pulley and a rear pulley movable relative to each other by the drive assembly to actuate the blade assembly, the front pulley being rotated faster than the rear pulley to actuate the arms toward the advanced positions, the front pulley being rotated slower than the rear pulley to actuate the arms toward the retracted positions.

20. The cable preparation machine of claim 18, wherein the braid blades are positionable by the arms in clearance positions, cutting positions and pinching positions, the braid blades engaging the cable braid in the pinching positions, the pinching positions being moved relative to the cutting positions.

* * * * *